(12) United States Patent
Lamba (10) Patent No.: US 11,301,831 B2
(45) Date of Patent: Apr. 12, 2022

(54) PAYMENT PROCESSING SYSTEM INCLUDING POINT-OF-SALE DEVICE WITH A UNIQUE IDENTIFIER AND ASSOCIATED METHODS

(71) Applicant: BlackBerry Limited, Waterloo (CA)

(72) Inventor: Jaspreet Lamba, Milton (CA)

(73) Assignee: BlackBerry Limited, Waterloo (CA)

( * ) Notice: Subject to any disclaimer, the term of this patent is extended or adjusted under 35 U.S.C. 154(b) by 794 days.

(21) Appl. No.: 15/160,626

(22) Filed: May 20, 2016

(65) Prior Publication Data

US 2016/0267460 A1  Sep. 15, 2016

Related U.S. Application Data

(63) Continuation of application No. 13/249,480, filed on Sep. 30, 2011, now abandoned.

(51) Int. Cl.
*G06Q 20/32* (2012.01)
*G06Q 20/02* (2012.01)
*G06Q 20/20* (2012.01)
*G06Q 20/40* (2012.01)

(52) U.S. Cl.
CPC ......... *G06Q 20/322* (2013.01); *G06Q 20/027* (2013.01); *G06Q 20/204* (2013.01); *G06Q 20/206* (2013.01); *G06Q 20/325* (2013.01); *G06Q 20/3278* (2013.01); *G06Q 20/401* (2013.01)

(58) Field of Classification Search
CPC .................................................. G06Q 20/327
See application file for complete search history.

(56) References Cited

U.S. PATENT DOCUMENTS

| | | | |
|---|---|---|---|
| 6,868,391 B1 * | 3/2005 | Hultgren | G06Q 20/02 705/17 |
| 7,379,901 B1 * | 5/2008 | Philyaw | G06Q 20/10 705/17 |
| 7,650,408 B2 | 1/2010 | Eubanks | |

(Continued)

FOREIGN PATENT DOCUMENTS

| | | |
|---|---|---|
| EP | 2088549 A1 | 8/2009 |
| EP | 2128809 A1 | 12/2009 |

(Continued)

OTHER PUBLICATIONS

Bouch, "3-D Secure: A critical review of 3-D Secure and its effectiveness in preventing card not present fraud", 2011, available at https://www.58bits.com/thesis/3-D_Secure.html, (Year: 2011).*

(Continued)

*Primary Examiner* — Allen C Chein
(74) *Attorney, Agent, or Firm* — Jenna L. Wilson; Wilson Lue LLP (57) ABSTRACT

In a payment processing system, a secure intermediary system associates payment processing devices including a POS device, mobile communication device, and transaction server with unique identifiers. The secure intermediary receives communications of transaction data from the payment processing devices, the communications including identifiers. The secure intermediary uses the unique identifiers to determine network addresses for the recipients of transaction data in support of a transaction.

20 Claims, 10 Drawing Sheets

(56) References Cited

U.S. PATENT DOCUMENTS

| | | | |
|---|---|---|---|
| 7,996,288 B1* | 8/2011 | Stolfo | G06Q 20/04 |
| | | | 705/35 |
| 8,316,440 B1 | 11/2012 | Hsieh et al. | |
| 8,635,087 B1 | 1/2014 | Igoe et al. | |
| 2005/0102233 A1 | 5/2005 | Park et al. | |
| 2007/0094113 A1* | 4/2007 | Chapeta | G06Q 20/20 |
| | | | 705/35 |
| 2007/0215695 A1* | 9/2007 | Trane | G06Q 20/206 |
| | | | 235/380 |
| 2008/0010215 A1* | 1/2008 | Rackley, III | G06Q 20/385 |
| | | | 705/70 |
| 2008/0078831 A1 | 4/2008 | Johnson et al. | |
| 2009/0313132 A1* | 12/2009 | McKenna | G06Q 20/047 |
| | | | 705/21 |
| 2010/0088149 A1 | 4/2010 | Sullivan et al. | |
| 2010/0320266 A1 | 12/2010 | White | |
| 2011/0034155 A1 | 2/2011 | Kamamoto | |
| 2012/0089713 A1 | 4/2012 | Carriere | |
| 2012/0131190 A1* | 5/2012 | Nauman | G06Q 20/02 |
| | | | 709/225 |
| 2012/0197740 A1 | 8/2012 | Grigg et al. | |
| 2012/0226565 A1* | 9/2012 | Drozd | G06Q 20/20 |
| | | | 705/16 |

FOREIGN PATENT DOCUMENTS

| | | |
|---|---|---|
| EP | 2189932 A1 | 5/2010 |
| WO | 02/46881 A2 | 6/2002 |
| WO | 2006/102747 A1 | 10/2006 |

OTHER PUBLICATIONS

"Best Practices for Credit Card Transaction Receipts", of Mar. 2010, https://web.archive.org/web/20101012204803/http://blog.unibulmerchantservices.com/best-practices-for-credit-card-transaction-receipts/ (Year: 2010).*

Examination Report dated Oct. 8, 2014 from Canadian Patent Application No. 2,790,983, 4 pgs.

"Does All VPN traffic pass trough the VPN Server or is it just for Authentication?", Jul. 20, 2011, available at http://superuser.com/questions/312563/does-all-vpn-traffic-pass-trough-the-vpn-server-or-is-it-just-for-authentication, 2 pgs.

Examination Report dated Feb. 14, 2017 from Canadian Patent Application No. 2,790,983, 4 pgs.

Examination Report dated Feb. 26, 2018 from Canadian Patent Application No. 2,790,983, 7 pgs.

Examination Report dated Dec. 10, 2018 from Canadian Patent Application No. 2,790,983, 6 pgs.

* cited by examiner

PAYMENT PROCESSING SYSTEM INCLUDING POINT-OF-SALE DEVICE WITH A UNIQUE IDENTIFIER AND ASSOCIATED METHODS

CROSS-REFERENCE TO RELATED APPLICATIONS

This application is a continuation of U.S. application Ser. No. 13/249,480, filed Sep. 30, 2011, the entirety of which is incorporated herein by reference.

TECHNICAL FIELD

The present disclosure relates to the field of mobile wireless communications devices, and, more particularly, to payment processing systems using mobile wireless communications devices.

BACKGROUND

Mobile wireless communications devices have become pervasive in today's society, and are carried daily by a large number of individuals. Part of the reason for their popularity is that such mobile wireless communications devices are now capable of more than simple voice communications. Indeed, some mobile wireless communications devices are now capable of acting as a personal digital assistant, performing functions such as keeping a calendar of daily appointments and maintaining a large address book. In addition, some mobile wireless communications devices have connectivity with the Internet via their cellular connection, and are thus capable of e-mail delivery and web browsing.

In addition to carrying a mobile wireless communications device, many individuals also carry a wallet containing numerous cards, such as driver's licenses, credit cards, bank cards, discount cards, rewards cards, and membership cards. This wide variety of cards can lead to a wallet being undesirably thick, taking up more space than desired in a pocket or a purse. One way in which to reduce this burden is to design mobile wireless communications devices that can carry the information contained in such cards (such as account access information), and payment processing systems that can access the information in those mobile wireless communications devices in order to process transactions.

While such mobile wireless communications devices have been successful at reducing the number of cards an individual carries, some users may be concerned about the security of using their mobile wireless communications devices with such payment processing systems. Consequently, the development of new payment processing systems having increased security is desirable.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime and multiple prime notation are used to indicate similar elements or steps in alternative embodiments.

Generally speaking, a payment processor system may include a mobile wireless communications device, a point-of-sale (POS) device, a secure intermediary to facilitate communications between the mobile wireless communications device and the POS device, and a transaction server.

The wireless communications device is therefore for communication with a point of sale (POS) device via a secure intermediary, the secure intermediary associating a unique POS identifier with the POS device, the POS device having a merchant account associated therewith. The wireless communications device may include a receiver module, and a memory configured to store account access information for a payment account. A processor may be coupled to the receiver module and the memory. The processor may be configured to determine the unique POS identifier using the receiver module, and send the account access information to the POS device via the secure intermediary and using the unique POS identifier, so that the POS device in turn causes a transfer of funds from the payment account to the merchant account.

The receiver module may comprise an image sensor, and the unique POS identifier may be encoded in a coded image. The processor may determine the unique POS identifier by capturing the coded image using the image sensor and decoding the coded image to thereby determine the unique POS identifier.

In some applications, the processor may be configured to encrypt the account access information before sending the account access information to the POS device, which in turn sends the account access information to a transaction server to thereby cause the transfer of funds. The memory may be configured to store account access information for a plurality of payment accounts, and the processor may be configured to permit selection of the payment account via an input device.

Additionally, the processor may be configured to receive a payment confirmation from the POS device via the secure intermediary, and may display the payment confirmation on a display. The processor may be configured to receive a payment verification request from the POS device via the secure intermediary, and may also be configured to send a payment verification to the POS device via the secure intermediary using the unique POS address.

A method aspect is directed to a method of operating the wireless communications device. The method is therefore a method of operating a wireless communications device for communication with a point of sale (POS) device via a secure intermediary, the secure intermediary associating a unique POS identifier with the POS device, the POS device having a merchant account associated therewith, the wireless communications device comprising a receiver module, a memory configured to store account access information for a payment account, and a processor coupled to the receiver module and the memory. The method includes determining the unique POS identifier using the receiver module in cooperation with the processor. The method further includes sending the account access information to the POS device via the secure intermediary and using the unique POS identifier, so that the POS device in turn causes a transfer of funds from the payment account to the merchant account, using the processor.

The POS device therefore comprises a POS device for communication with a secure intermediary, the secure intermediary associating a unique POS identifier with the POS device, the POS device having a merchant account associated therewith. The POS device may include a processor configured to receive, via the secure intermediary and based upon the unique POS identifier, account access information for a payment account sent to the secure intermediary by a wireless communications device. The processor may be further configured to send the account access information together with transaction information to a transaction server to thereby cause a transfer of funds from the payment account to the merchant account.

The POS device may include a display, and the processor may be configured to generate a coded image from the unique POS identifier. The processor may also be configured to display the coded image on the display so that the wireless communications device captures the coded image using an image sensor.

Alternatively, a housing may carry the processor. A substrate may be carried by the housing and have a coded image thereon representing the unique POS identifier so that the wireless communications device captures the coded image using an image sensor.

The processor may be configured to send the account access information and the transaction information to the transaction server via the secure intermediary and using a unique transaction server identifier. In addition, the processor may be configured to send the account access information and the transaction information to the transaction server via a virtual private network (VPN).

A method aspect is therefore directed to a method of operating point of sale (POS) device for communication with a secure intermediary, the secure intermediary associating a unique POS identifier with the POS device, the POS device having a merchant account associated therewith. The method may include receiving, via the secure intermediary and based upon the unique POS identifier, account access information for a payment account sent to the secure intermediary by a wireless communications device, using a processor. The method may further include sending the account access information together with transaction information to a transaction server to thereby cause a transfer of funds from the payment account to the merchant account, using the processor.

The secure intermediary is therefore a server configured to operate as a secure intermediary between a point of sale (POS) device and a wireless communications device, the secure intermediary associating a unique POS identifier with the POS device and a unique wireless communications device identifier with the wireless communications device. The server comprises a network interface, and a processor coupled to the network interface. The processor may be configured to receive the unique POS identifier and account access information from the wireless device, and send the account access information to the POS device using the unique POS identifier, so that the POS device causes a transfer of funds from a payment account associated with the account access information to a merchant account associated with the POS device.

The processor may be configured to receive a transaction confirmation from the POS device, and send the transaction confirmation to the wireless communications device using the unique wireless communications device identifier. The processor may be configured to receive a transaction verification request from the POS device. In addition, the processor may be further configured to send the transaction verification request to the wireless communications device using the unique wireless communications device identifier, and to receive a transaction verification from the wireless communications device. The processor may also be configured to send the transaction verification to the POS device using the unique POS identifier.

A method aspect is therefore directed to a method of operating a server to act as a secure intermediary between a point of sale (POS) device and a wireless communications device, the secure intermediary associating a unique POS identifier with the POS device and a unique wireless communications device identifier with the wireless communications device. The method may include receiving the unique POS identifier and account access information from the wireless device, using a processor in cooperation with a network interface. The method may further include sending the account access information to the POS device using the unique POS identifier, so that the POS device causes a transfer of funds from a payment account associated with the account access information to a merchant account associated with the POS device, using the processor in cooperation with the network interface.

Other aspects are directed to a payment processor system that may comprise a wireless network, a relay network, and a point of sale (POS) device having associated therewith a merchant account and a coded image including a first relay network address of the POS device. The payment processor system may also include a mobile wireless communications device, which may have an image sensor and a processor coupled thereto. The processor may be configured to determine the first relay network address of the POS device based upon the coded image, and send the first relay network address of the POS device and account access information for a payment account to the relay network via the wireless network.

In addition, the relay network may be configured to send the account access information to the POS device based upon the first relay network address. Further, the POS device may also be configured to cause a transfer of funds from the payment account to the merchant account associated with the POS device, based upon the account access information.

This payment processing system advantageously allows payment transactions to be processed in a quick and secure manner.

In some applications, the POS device may comprise a display, and the POS device may be configured to present the coded image via the display. Additionally or alternatively, a substrate may be carried by the POS device and may have the coded image thereon. Further, the mobile wireless communications device may have an input device, and the processor may be configured to permit selection of the payment account via the input device.

The mobile wireless communications device may have associated therewith a wireless network address and a second relay network address. The POS device may also be configured to send a transaction confirmation to the relay network after effectuating the transfer of funds from the payment account to the merchant account, and the relay network may be configured to determine the wireless network address of the mobile wireless communications device based upon the second relay network address, and to send the transaction confirmation to the mobile wireless communications device based upon the wireless network address.

The POS device may be configured to send payment information to the relay network. The relay network may be configured to determine the wireless network address of the mobile wireless communications device based upon the second relay network address, and to send the payment information to the mobile wireless communications device based upon the wireless network address.

The processor of the mobile wireless communications device may be further configured to accept a payment authorization and to send the payment authorization to the relay network via the wireless network. In addition, the relay network may be configured to send the payment authorization to the POS device based upon the first relay network address, and the POS device may be configured to cause the transfer of funds also based upon the payment authorization.

The payment processor system may include a credit server, and the POS device may also be configured to cause a transfer of funds from the payment account to the merchant account by sending the account access information and the payment authorization to the credit server. The POS device may send the account access information and the payment authorization to the credit server via a virtual private network (VPN). Additionally or alternatively, the credit server may have a third relay network address associated therewith, and the POS device may send the account access information and the payment authorization thereto via the relay network and based upon the third relay network address.

A method aspect is directed to a method of operating a payment processor system comprising a wireless network, a relay network, a point of sale (POS) device having associated therewith a merchant account and a coded image including a first relay network address of the POS device, and a mobile wireless communications device comprising a processor coupled to an image sensor. The method may include determining the first relay network address of the POS device based upon the coded image, using the processor in cooperation with the image sensor, and sending the first relay network address of the POS device and account access information for a payment account to the relay network via the wireless network, using the processor. The method may further include sending the account access information to the POS device based upon the first relay network address, using the relay network, and causing a transfer of funds from the payment account to the merchant account associated with the POS device, based upon the account access information, using the POS device.

Figure 1:
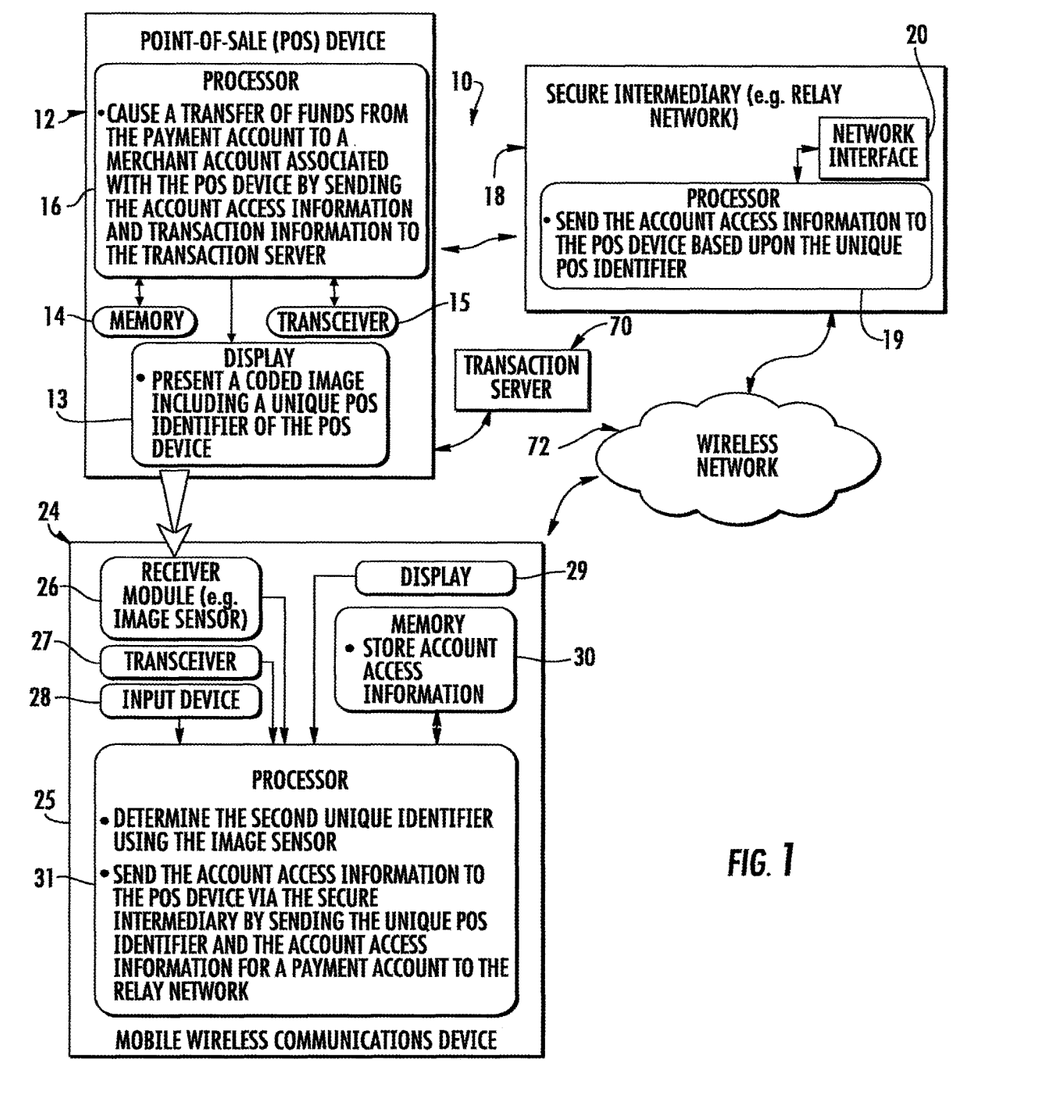
FIG. 1 is a schematic block diagram of a payment processing system in accordance with the present disclosure.

With reference to FIG. 1, a payment processor system 10 is now described. The payment processor system 10 includes a point-of-sale (POS) device 12, wireless network 72, secure intermediary (e.g. a relay network) 18, and mobile wireless communications device 24. The wireless network 72 may be a cellular network enabling data communications, for example.

The relay network 18 facilitates secure and encrypted communications between the various components of the payment processor system 10, as will be appreciate by those of skill in the art. Devices, such as the mobile wireless communications device 24 that communicate on the wireless network 72 each have a wireless network address, which is referred to as an international mobile equipment identifier (IMEI) on some cellular networks. While the mobile wireless communications device 24 may encrypt data before sending the data to a recipient over the wireless network 72, and recipient devices may decrypt the data upon receipt, the wireless network itself may be inherently unsecure. To add security to the payment processor system 10, communications between the mobile wireless communications device 24 and POS device 12, for example, may be routed through the relay network 18. Each device with which the relay network 18 communicates may have a unique identifier or relay network address, which may be referred to as a personal identification number (PIN).

When a device on the wireless network 72, such as the POS device 12, is to send a message or item of data to another device on the wireless network, such as the mobile wireless communications device 24, the POS device 12 sends the message to the relay network 18 via the wireless network or via a wired network. Included with the message is the unique identifier of the recipient of the message. The relay network 18 may then determine the wireless network address (or wide area network address) of the recipient based upon the unique identifier of the recipient (for example, by using a lookup table), and send the message to the recipient at that wireless network address.

The relay network 18 is secure and under the control of a secure entity, and therefore message and data transmission thereover is secure. By having the relay network 18 route messages and data between the mobile wireless communications device 24 and POS device 12, those devices receive messages and data from a secure source (the relay network 18), as opposed to receiving messages and data from another device on the wireless network 72, which may not be secure. Therefore, the relay network 18 increases the security of the payment processing system 10.

The POS device 12 includes a processor 16 coupled to a display 13, memory 14, and transceiver 15. The transceiver 15 may provide the POS device 12 with connectivity to a wide area network, such as the Internet, through which the POS device 12 can communicate with a transaction server for effectuating transactions, as will be explained in detail below.

The POS device 12 has a relay network address (hereinafter referred to as a unique POS identifier) associated therewith. This unique POS identifier may be static and unchanging in some applications. The processor 16 is configured to display, on the display 13, a coded image including the unique POS identifier. The coded image may be a barcode, QR code, or any suitable coded image capable of encoding the unique POS identifier.

Example mobile wireless communications devices 24 may include portable or personal media players (e.g., music or MP3 players, video players, etc.), remote controls (e.g., television or stereo remotes, etc.), portable gaming devices, portable or mobile telephones, smartphones, tablet computers, etc. The mobile wireless communications device 24 includes a housing 25 carrying an image sensor 26, transceiver 27, input device 28, display 29, memory 30, and processor 31. The processor 31 is coupled to the image sensor 26, transceiver 27, input device 28, display 29, and memory 30.

The input device 28 may be a keyboard, touch sensitive pad, trackball, thumbwheel, button, microphone, or other suitable device, for example. It should be appreciated that in some applications, the display 29 may be a touch sensitive display, and may therefore serve as the input device 28. The image sensor 26 may be a CMOS image sensor, for example. In addition, the transceiver 27 may be a cellular transceiver, and may be configured to perform both voice and data cellular communications.

The memory 30 may include volatile and non-volatile portions, and is configured to store access information for a purchaser account associated with the mobile wireless communications device 24. The purchaser account may be a credit card account, bank account, gift card account, or other suitable account.

Figure 7:
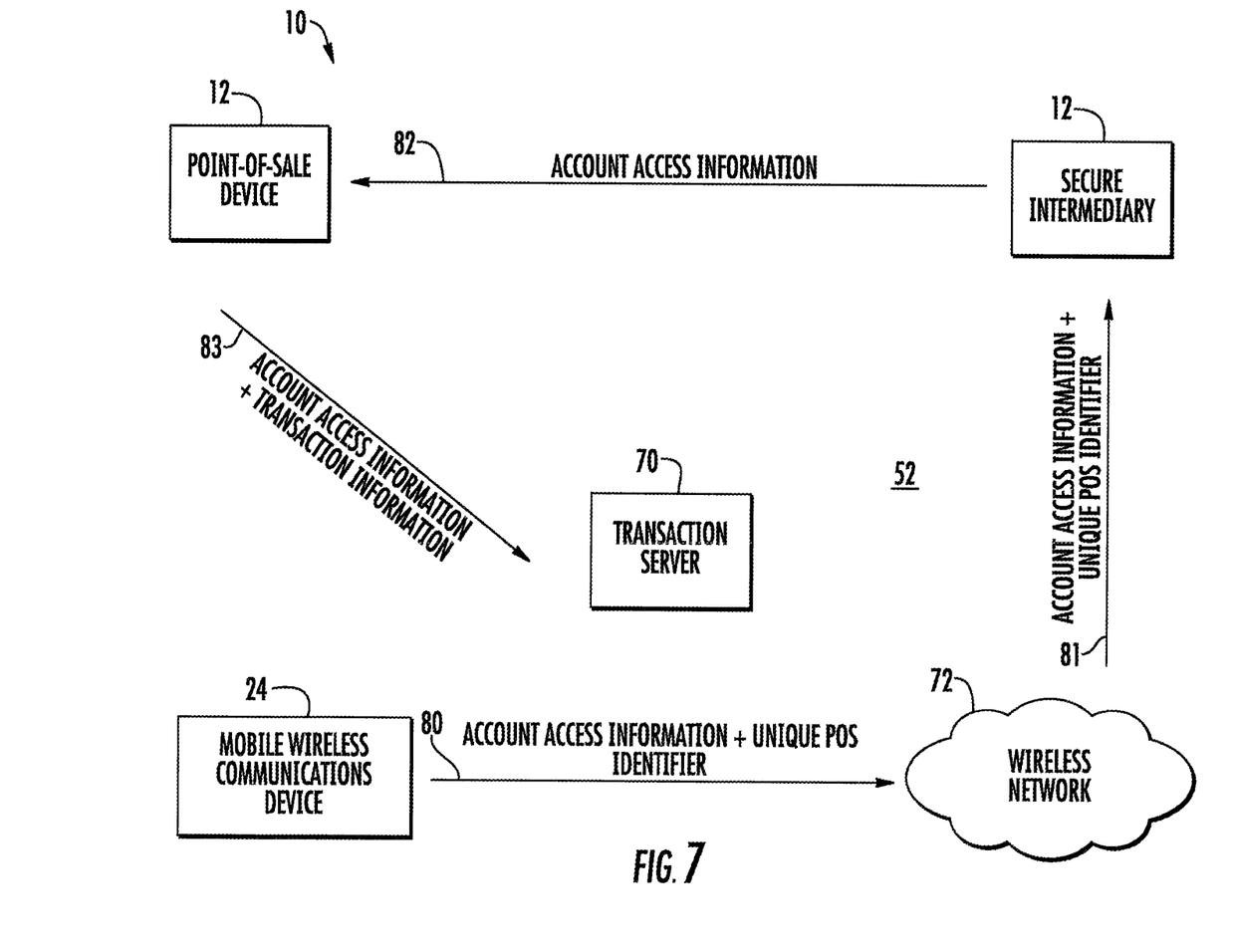
FIG. 7 is a block diagram of the embodiment of the payment processing system of FIG. 1 showing transmission of data between the components thereof.

With further reference to FIG. 7, the operation of the payment processor system 10 is now described. The processor 31 of the mobile wireless communications device 24 is configured to determine the unique POS identifier of the POS device 12 based upon the coded image, using the image sensor 26. The processor 31 does this by sensing the coded image using the image sensor 26, and then decoding the coded image to thereby determine the unique POS identifier.

Once the processor 31 has determined the unique POS identifier, the processor 31 sends the unique POS identifier, together with the account access information to the POS device 12 via the relay network 18. The processor 31 cooperates with the transceiver 27 to send the unique POS identifier and account access information to the wireless network 72 (Arrow 80). The wireless network 72 in turn sends the unique POS identifier and account access information to the relay network 18 (Arrow 81). The relay network 18 then sends the account access information to the POS device 12 using the unique POS identifier (Arrow 82). The relay network 18 may send the access information to the POS device 12 via a direct connection, or via a network connection, such as the internet or the wireless network 72, as will be appreciated by those of skill in the art. If the relay network 18 is to send the access information to the POS device 12 via a network, the relay network 18 first determines a network address of the POS device based upon the unique POS identifier, and then sends the access information to the POS device 12 using the network address. Determining the network address may be performed through the use of a look-up table, for example.

Since the POS device 12 now has the account access information, the processor 16 thereof causes a transfer of funds from the payment account to a merchant account associated with the POS device, based upon the account access information. The processor 16 does this by sending the account access information together with transaction information (e.g. the amount of the transaction, etc) to a transaction server (e.g. a credit server) 70 (Arrow 83). The transaction server 70 then transfers the appropriate funds from the payment account to a merchant account. The POS device 12 may send the account access information and the transaction information to the transaction server in a secure fashion, utilizing encryption such as SSL, or over a virtual private network (VPN).

Figure 2:
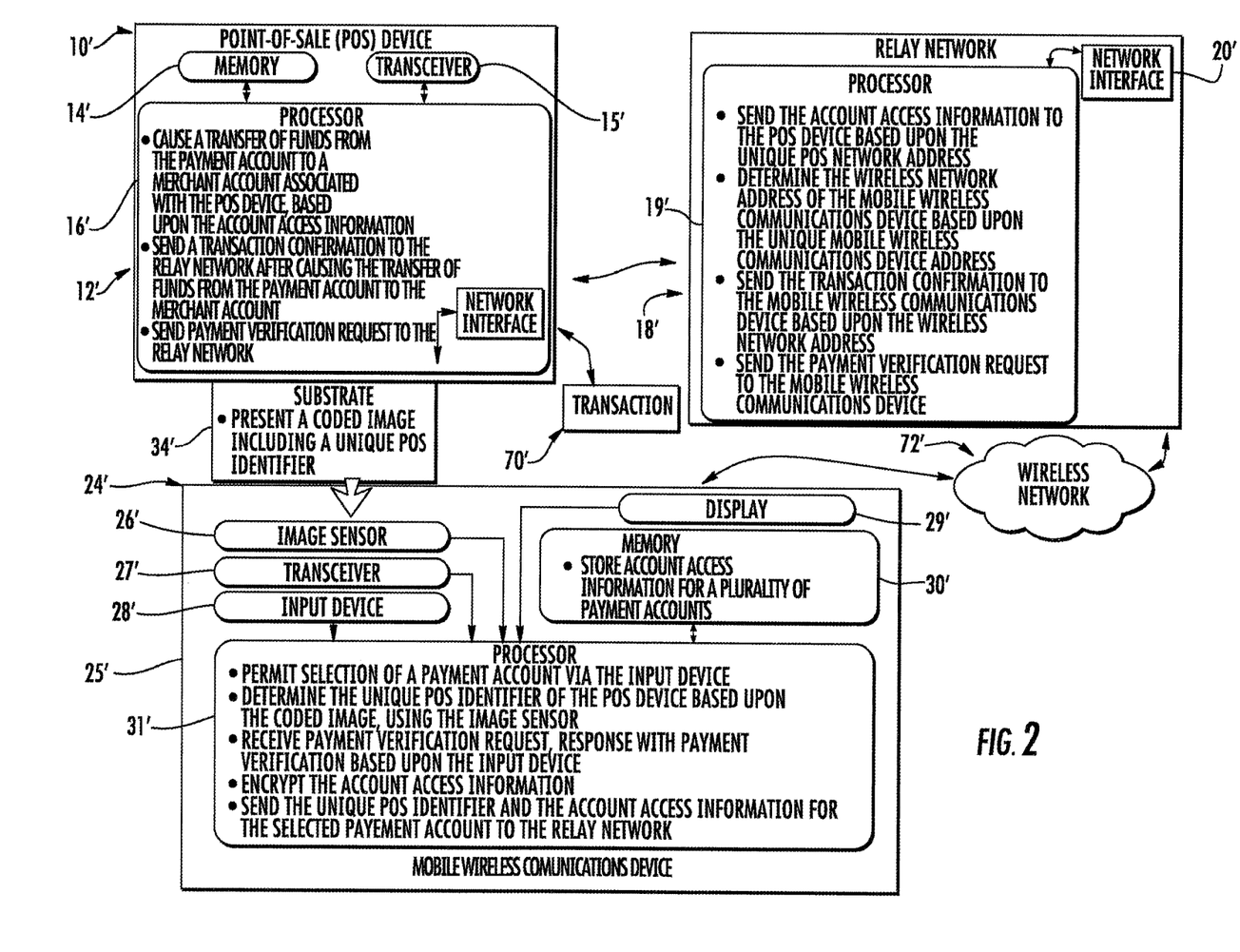
FIG. 2 is a schematic block diagram of another embodiment of a payment processing system in accordance with the present disclosure.

In the embodiment of the payment processor system 10' shown in FIG. 2, a substrate 34', such as a sticker, sign, or placard, is associated with the POS device 16'. For example, the substrate 34' may be a sticker affixed to the POS device 16'. The substrate 34' presents the coded image which encodes the unique POS identifier of the POS device 16'.

In addition, the memory 30' of the mobile wireless communications device 24' is configured to store access information for a plurality of payment accounts. The processor 31' is configured to permit selection of a payment account from the plurality thereof via the input device 28'. The processor 31' then determines the unique POS identifier, as described above, using the image sensor.

Figure 8:
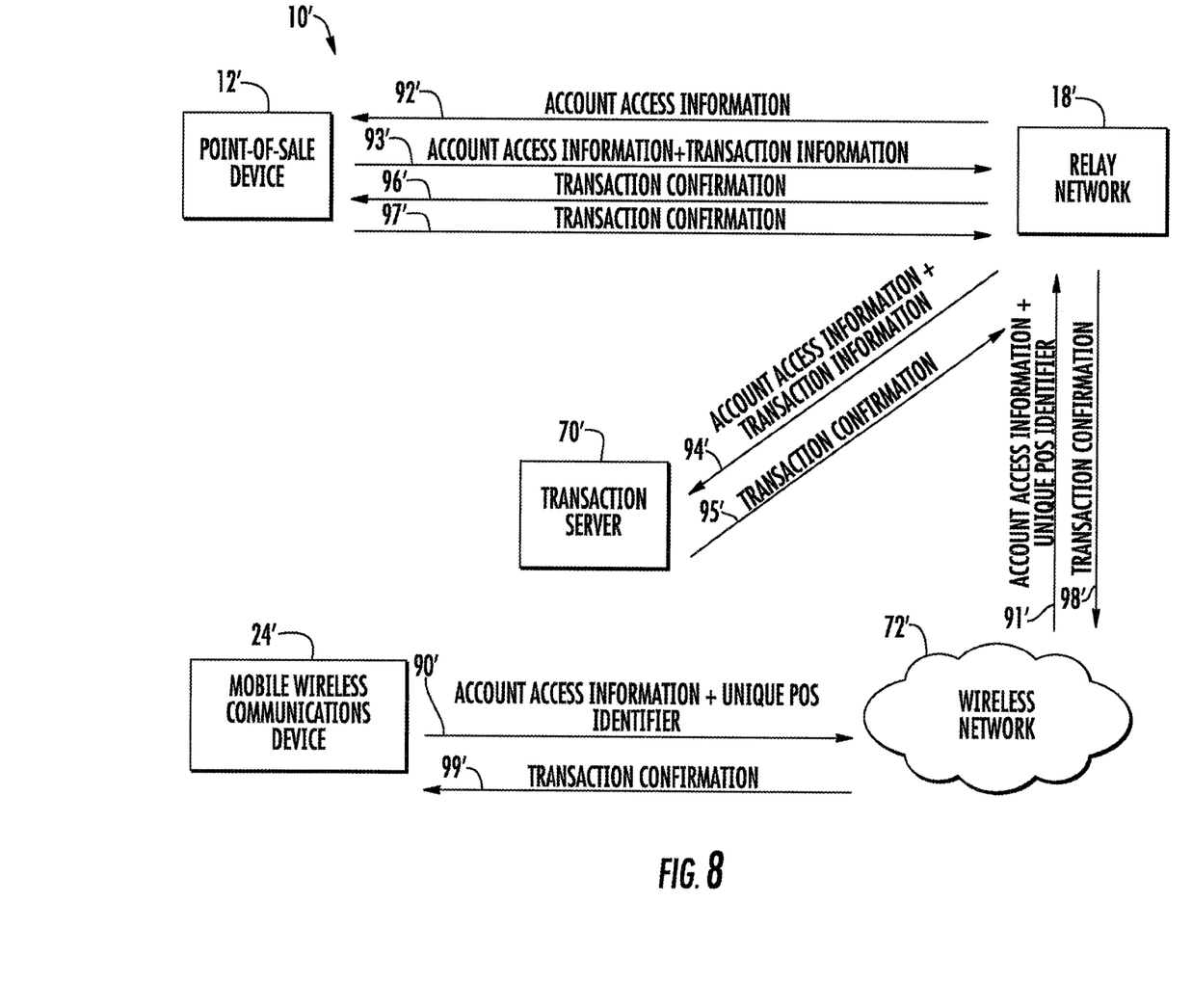
FIG. 8 is a block diagram of the embodiment of the payment processing system of FIG. 2 showing transmission of data between the components thereof.

With additional reference to FIG. 8, the operation of the payment processor system 10' will now be explained. Once the processor 31' determines the unique POS identifier of the POS device 12', the processor 31' sends the unique POS identifier together with the access information for the selected payment account to the wireless network 72' (Arrow 90'). The wireless network 72' in turn sends the account access information and the unique POS identifier to the relay network 18' (Arrow 91'), as described above. The relay network then sends the account access information to the POS device 12' (Arrow 92'), either directly or indirectly.

The POS device 12' then sends the account access information together with transaction information to the transaction server 70', via the relay network 18'. Therefore, the POS device 12' sends the account access information and transaction information to the relay network 18' (Arrow 93'), which in turn sends the account access information and transaction information to the transaction server 70' (Arrow 94'). Here, the transaction server 70" may have a unique transaction server identifier associated therewith, and the POS device 12' may send the account access information and transaction information thereto, through the relay network 18', using the unique transaction server identifier. The relay network 18' may send the account access information and transaction information to the transaction server 70' either directly, or indirectly through a network.

In the case that the relay network 18' sends the account access information and transaction information indirectly, the transaction server may have a second network address associated therewith, and the relay network may determine the second network address based upon the unique transaction server identifier, and send the account access information and transaction information to the transaction server 70' using the second network address.

The transaction server 70' causes the transfer of funds from the purchaser account to the merchant account, generates a transaction confirmation indicating that the transaction was successfully processed, and sends the transaction confirmation to the POS device 12' via the relay network 18'. To accomplish this, the transaction server 70' sends the transaction confirmation to the relay network 18' (Arrow 95'), and the relay network 18' in turn sends the transaction confirmation to the POS device 12' (Arrow 96').

The POS device 12' then sends the transaction confirmation to the mobile wireless communications device 24' via the relay network 18' and wireless network 72'. Therefore, the POS device 12' sends the transaction confirmation first to the relay network 18' (Arrow 97'), which in turn sends the transaction confirmation to the wireless network 72' (Arrow 98'). The wireless network 72' thereafter sends the transaction confirmation to the mobile wireless communications device 24' (Arrow 99'). The processor 31' of the mobile wireless communications device 24' may then display the transaction confirmation on the display 29'.

Those portions of the POS device 12', relay network 18', and mobile wireless communications device 24' not specifically described are similar to those of the payment processor system 10 described above with reference to FIG. 1 and need no further description herein.

Figure 3:
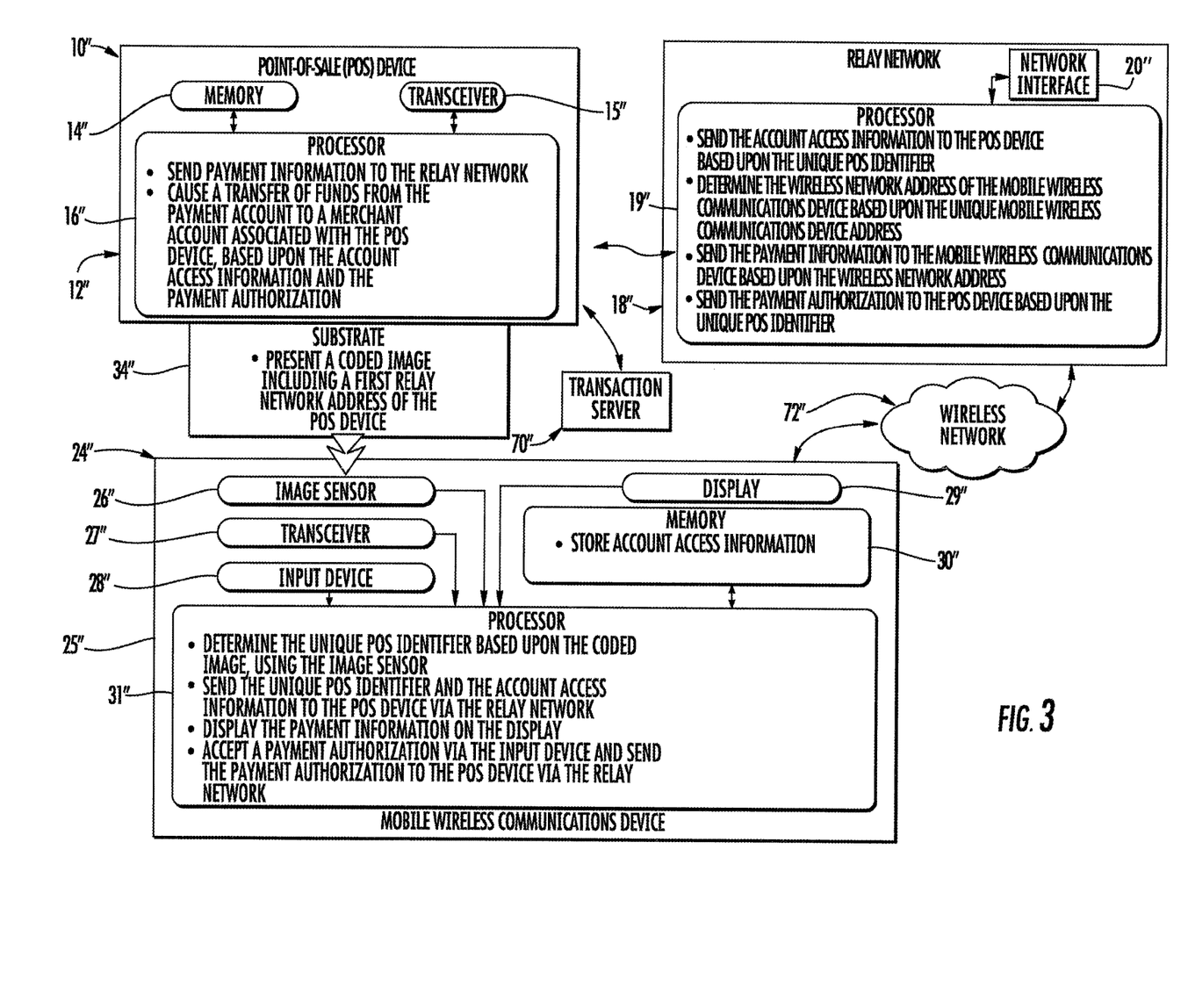
FIG. 3 is a schematic block diagram of a further embodiment of a payment processing system in accordance with the present disclosure.

A further embodiment of the payment processor system 10" is now described with reference to FIG. 3. Here, the POS device 12", relay network 18", mobile wireless communications device 24", and substrate 34" function similar to those described above with reference to FIGS. 1-2. Reading and determination of the unique POS identifier of the POS device 12" are discussed above with reference to the payment processor system of FIG. 2. Operation of the payment processor system 12" proceeds differently than that of the payment processor system of FIG. 2, and is described herein below.

Figure 9:
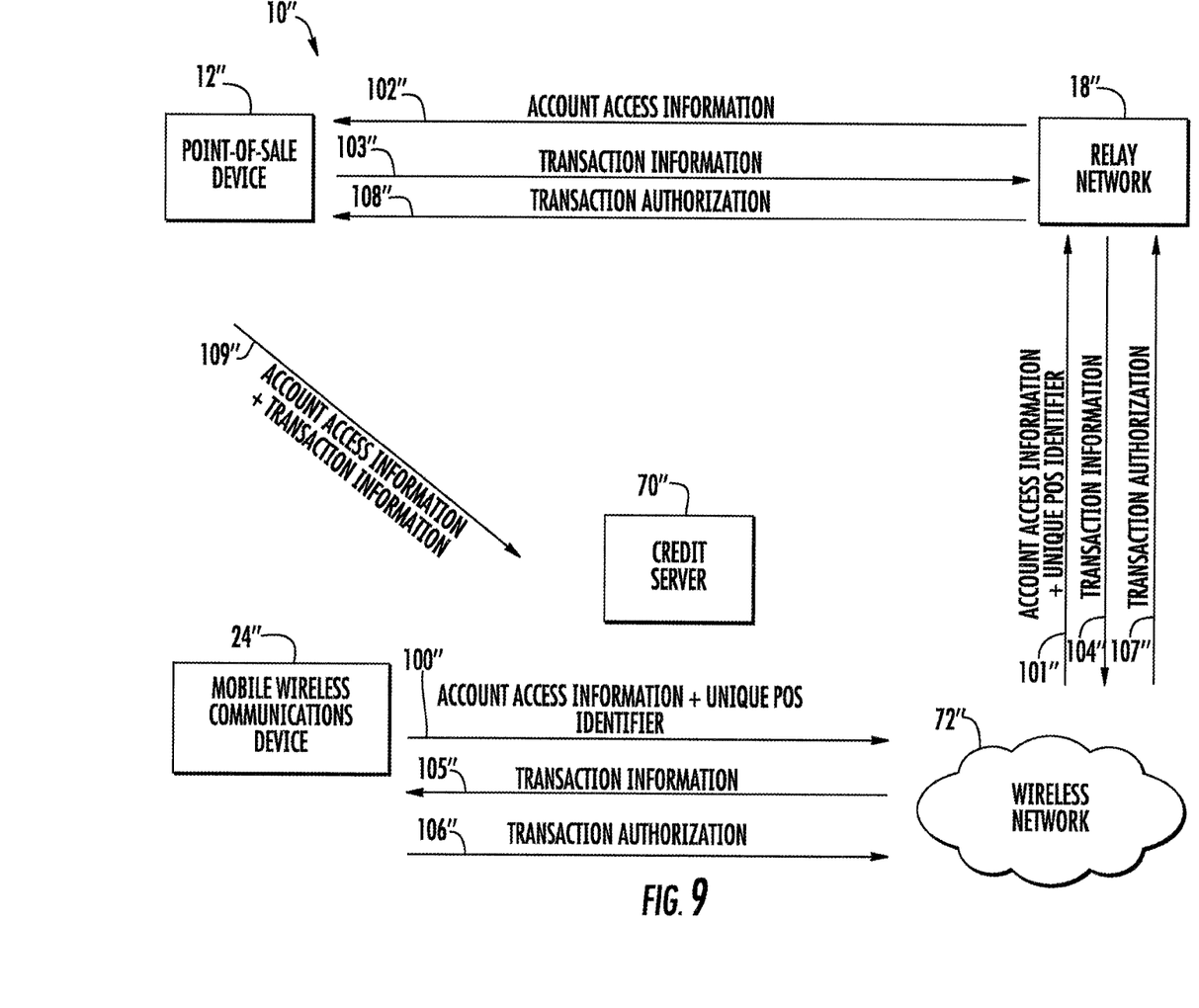
FIG. 9 is a block diagram of the embodiment of the payment processing system of FIG. 3 showing transmission of data between the components thereof.

With additional reference to FIG. 9, operation of the payment processor system 10" is now described. The account access information and the unique POS identifier are sent by the mobile wireless communications device 24" to the wireless network 72" (Arrow 100"), which in turn sends the account access information and the unique POS identifier to the relay network 18" (Arrow 101"). The relay network 18" then sends the account access information to the POS device 12" (Arrow 102") as described above.

The POS device 12" then sends the transaction information back to the mobile wireless communications device 24" via the relay network 18". Therefore, the POS device 12" sends the transaction information to the relay network 18" (Arrow 103"), which in turn sends the transaction information to the wireless network 72" (Block 104"). The wireless network then sends the transaction information to the mobile wireless communications device 24" (Arrow 105"). As will be appreciated by those of skill in the art, this payment information may include a variety of information about the transaction, possibly including a price for each item or service to be purchased, a subtotal for all items or services to be purchased, a sales tax amount for the subtotal, and even a total purchase amount.

The processor 31" of the mobile wireless communications device 24" may then present the payment information on the display 29". The processor 31" may accept a payment authorization via the input device 28" and send the payment authorization to the relay network 18". This payment authorization represents a user authorization of the transaction. This feature therefore allows a user to see the payment information before deciding whether or not to authorize the transfer of funds. In some applications, the processor 31" may even allow the addition of an additional amount to the transaction (e.g. a tip or gratuity), and this additional amount may be part of the payment authorization sent to the relay network 18".

The mobile wireless communications device 24" then sends the transaction authorization back to the POS device 12" by sending the transaction authorization to the wireless network 72" (Arrow 106"), which in turn sends the transaction authorization to the relay network (Arrow 107"), which then sends the transaction authorization to the POS device (Arrow 108"). After receiving the transaction authorization, the POS device 12" may update the transaction information (e.g. adding a tip or gratuity), and sends the account access information together with the transaction information to the transaction server 70" (Arrow 109"). The transaction server 70" processes the transaction.

It should be understood that although the different embodiments of the payment processing systems 10, 10', 10" described above may have different features, the present disclosure envisions payment processing systems having these features combined in any fashion. Therefore, the embodiments described herein should not be construed as limiting.

Figure 4:
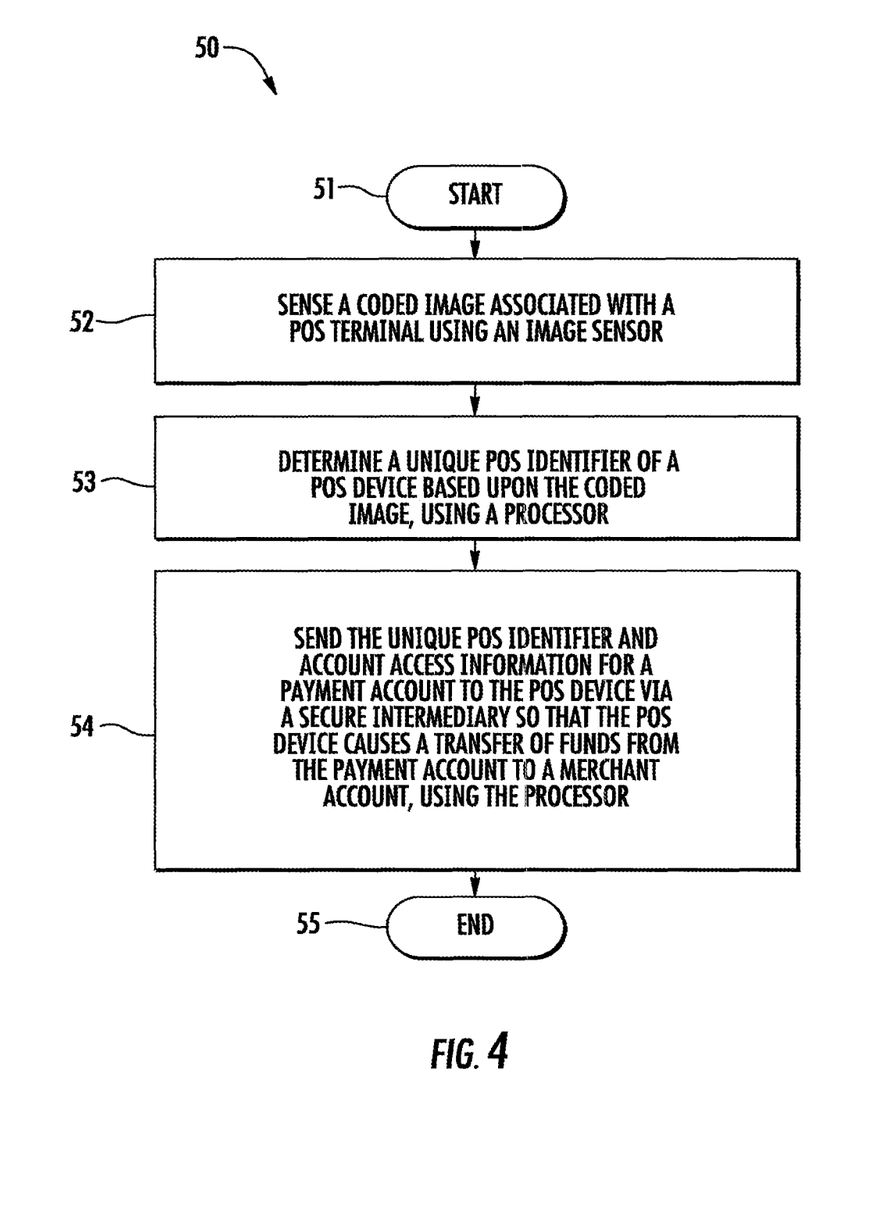
FIG. 4 is a flowchart of a method of operating the mobile wireless communications device of the present disclosure.

A method of operating the mobile wireless communications devices described above is now described with reference to the flowchart 50 of FIG. 4. After the start (Block 51), a coded image associated with a POS terminal is sensed using an image sensor (Block 52). Next, a unique POS identifier of the POS device is determined based upon the coded image, using a processor (Block 53). The unique POS identifier is then sent, together with account access information for a payment account, to the POS via a secure intermediary so that the POS device causes a transfer of funds from the payment account to a merchant account, using the processor (Block 54). Block 55 indicates the end of the method.

Figure 5:
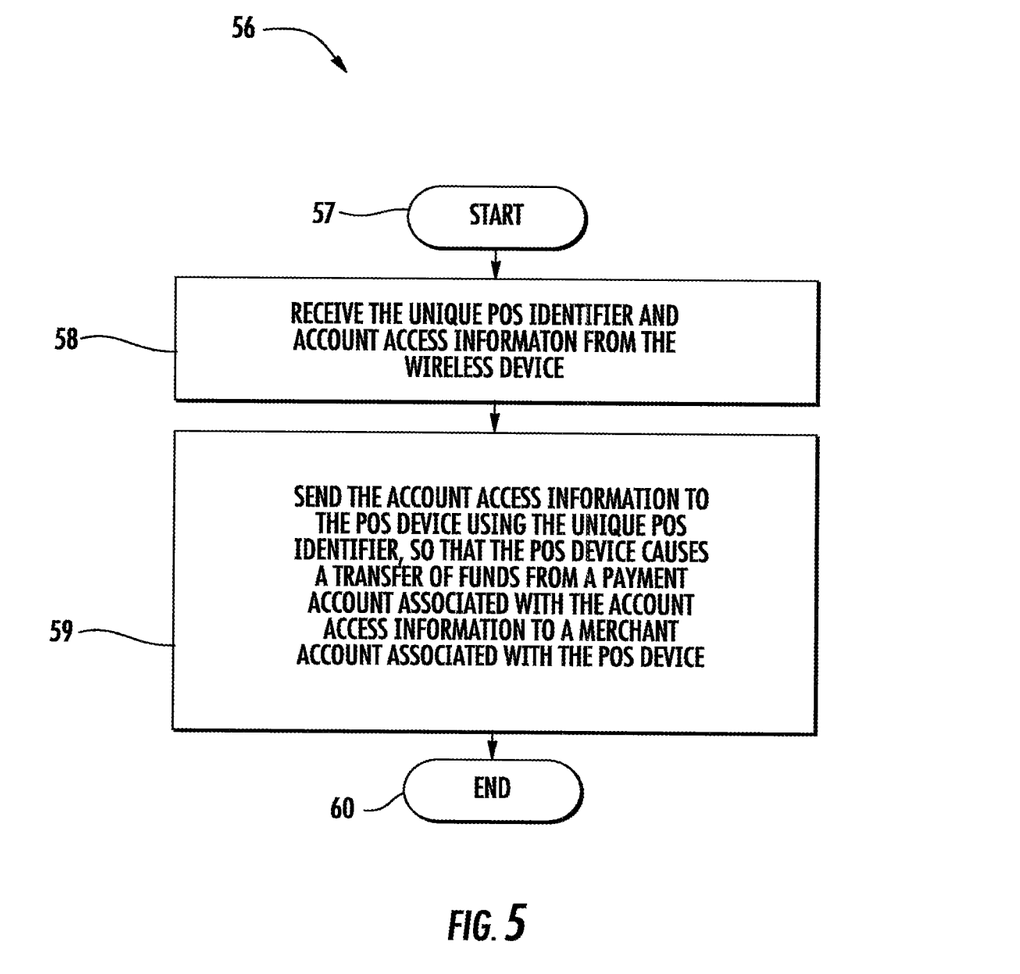
FIG. 5 is a flowchart of a method of operating the secure intermediary of the present disclosure.

A method of operating the secure intermediary described above is now described with reference to flowchart 56 of FIG. 5. After the start (Block 57), the unique POS identifier is received together with account access information from the wireless device (Block 58). The account access information is then sent to the POS device using the unique POS identifier, so that the POS device causes a transfer of funds from a payment account associated with the account access information to a merchant account associated with the POS device (Block 59). Block 60 indicates the end of the method.

Figure 6:
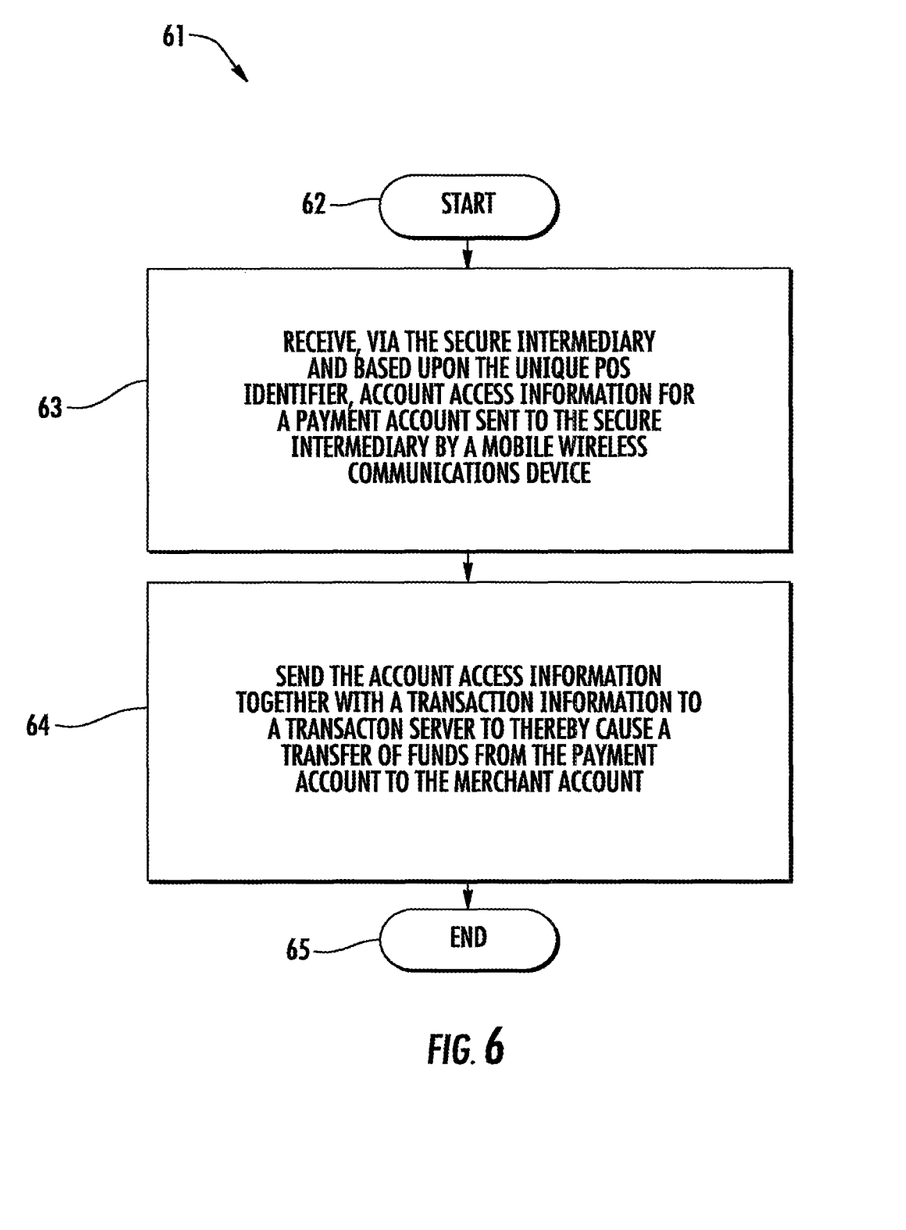
FIG. 6 is a flowchart of a method of operating the POS device of the present disclosure.

A method of operating the POS device discussed above is now described with reference to flowchart 61 of FIG. 6. After the start (Block 62), account access information for a secure payment account sent to the secure intermediary by a mobile wireless communications device is received based upon the unique POS identifier (Block 63). Thereafter, the account access information and transaction information are sent to a transaction server to thereby cause a transfer of funds from the payment account to a merchant account (Block 64). Block 65 indicates the end of the method.

Example components of a mobile wireless communications device 1000 that may be used in accordance with the above-described embodiments are further described below with reference to FIG. 10. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 10:
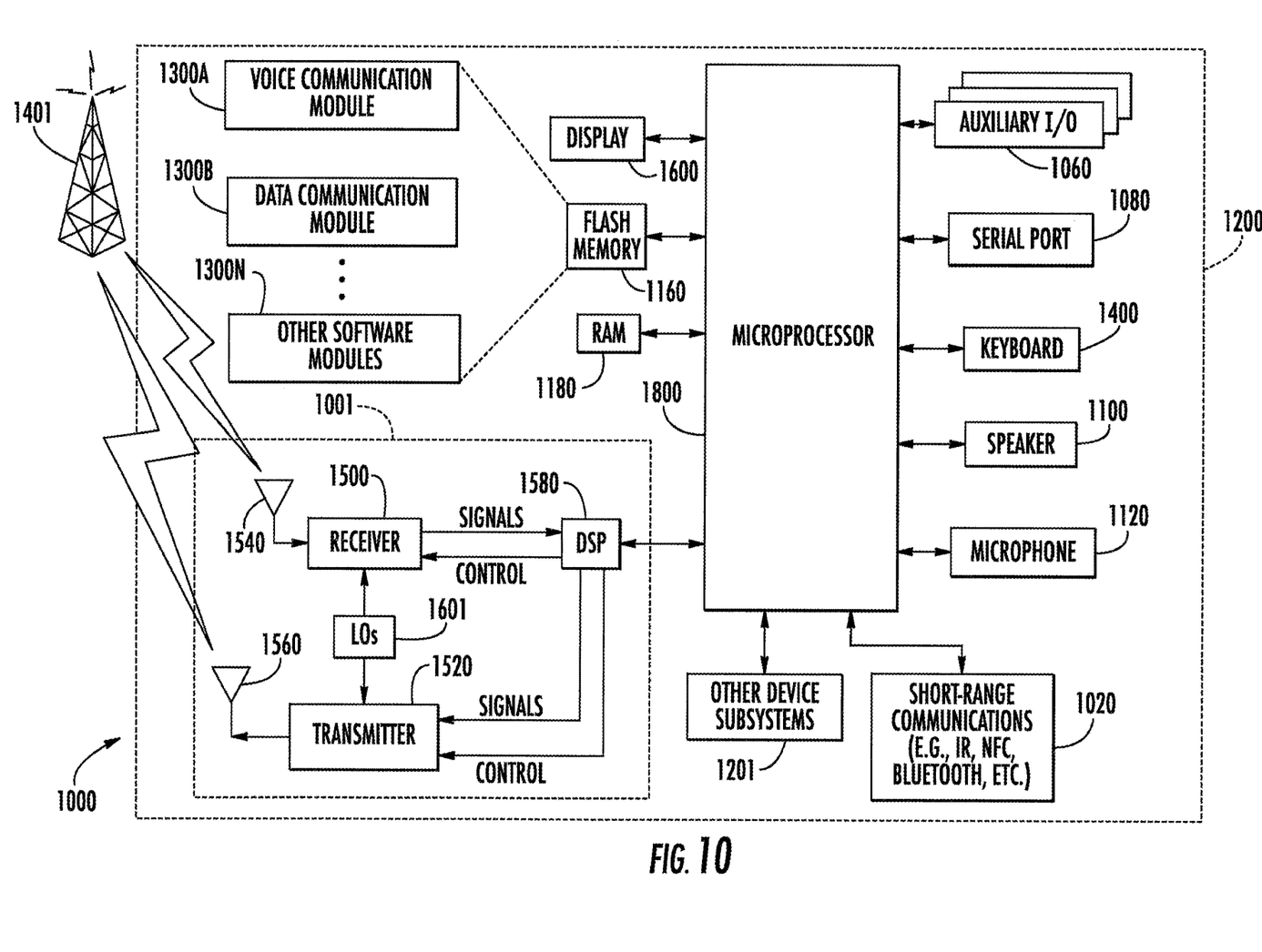
FIG. 10 is a schematic block diagram illustrating example components of a mobile wireless communications device that may be used with the payment processing systems of FIGS. 1, 2, and 3.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A system comprising:
a user mobile communication device comprising a network interface, a memory, and a processor in communication with the network interface and the memory, the processor being configured to initiate a transaction by obtaining a unique identifier identifying a first recipient system comprising a point-of-sale system, and sending a communication comprising payment account information from a payment card, data representative of the unique identifier, and a transaction authorization;

a server system configured to operate as a secure intermediary between a plurality of other devices comprising a network interface, a memory, and a processor in communication with the network interface and the memory, wherein communications with the server system are encrypted, the processor being configured to:

receive the communication from the user mobile communication device and determine, using the received data representative of the unique identifier and a set of unique identifiers stored in the memory in association with corresponding network addresses, a first network address for the first recipient system, and transmit the received payment account information and the transaction authorization to the first recipient system at the first network address, the data representative of the unique identifier being different from the first network address;

receive, from the first recipient system, a communication comprising the payment account information, transaction information for the transaction, and a unique identifier identifying a second recipient system, the second recipient system comprising a transaction server;

determine, using the unique identifier received from the first recipient system and the set of unique identifiers stored in the memory in association with corresponding network addresses, a second network address for the second recipient system, and transmit the payment account information and transaction information to the second recipient system at the second network address for processing the transaction, the unique identifier received from the first recipient system being different from the second network address;

receive, from the second recipient system, a transaction confirmation message; and in response to receiving the transaction confirmation message from the second recipient system, send the transaction confirmation to the first recipient system using the first network address;

receive, from the first recipient system, a further communication comprising the transaction confirmation and a unique identifier identifying the user mobile communication device; and in response to receiving the further communication, determine a network address for the user mobile communication device from the unique identifier identifying the user mobile communication device and send the transaction confirmation to the user mobile communication device.

2. The server system of claim 1, further comprising the first recipient system, the first recipient system comprising a display and a processor configured to generate an image using the unique identifier associated with the first recipient system and display the image on a display to thereby provide the user mobile communication device with the data representative of the unique identifier associated with the first recipient system.

3. The server system of claim 1, wherein the processor is further configured to transmit the transaction information received from the first recipient system to the user mobile communication device prior to receiving the transaction authorization.

4. The server system of claim 1, wherein the transaction authorization is received from the user mobile communication device separately from the payment account information and the data representative of the unique identifier associated with the first recipient system.

5. The server system of claim 4, wherein the transaction authorization is received from the user mobile communication device with further information altering the transaction information, and the processor is further configured to provide the further information to the first recipient system, the further information comprising a transaction amount.

6. The system of claim 1, wherein the payment account information comprises information from a credit card, debit card, or gift card.

7. A method, comprising:

a user mobile communication device initiating a transaction, the initiating comprising the user mobile communication device obtaining a unique identifier identifying a first recipient system comprising a point-of-sale system, and sending a communication comprising payment account information from a payment card, data representative of the unique identifier, and a transaction authorization to a server system configured to operate as a secure intermediary between a plurality of other devices wherein communications with the server system are encrypted;

the server system:

receiving the communication from the user mobile communication device and determining, using the received data representative of the unique identifier and a set of unique identifiers stored in the memory in association with corresponding network addresses, a first network address for the first recipient system, and transmitting the received payment account information and the transaction authorization to the first recipient system at the first network address, the data representative of the unique identifier being different from the first network address;

receiving, from the first recipient system, a communication comprising the payment account information, transaction information for the transaction, and a unique identifier identifying a second recipient system, the second recipient system comprising a transaction server;

determining, using the unique identifier received from the first recipient system and the set of unique identifiers stored in the memory in association with corresponding network addresses, a second network address for the second recipient system, and transmitting the payment account information and transaction information to the second recipient system at the second network address for processing the transaction, the unique identifier received from the first recipient system being different from the second network address;

receiving, from the second recipient system, a transaction confirmation message; and in response to receiving the transaction confirmation message from the second recipient system, sending the transaction confirmation to the first recipient system using the first network address;

receiving, from the first recipient system, a further communication comprising the transaction confirmation and a unique identifier identifying the user mobile communication device; and in response to receiving the further communication, determine a network address for the user mobile communication device from the unique identifier identifying the user mobile communication device and sending the transaction confirmation to the user mobile communication device.

8. The method of claim 7, further comprising the first recipient system generating an image using the unique identifier associated with the first recipient system, and displaying the image on a display to thereby provide the user mobile communication device with the data representative of the unique identifier associated with the first recipient system.

9. The method of claim 8, further comprising the user mobile communication device capturing the image using a sensor, the data representative of the unique identifier associated with the first recipient system comprising captured image data.

10. The method of claim 7, further comprising transmitting the transaction information received from the first recipient system to the user mobile communication device prior to receiving the transaction authorization.

11. The method of claim 7, wherein the transaction authorization is received from the user mobile communication device separately from the payment account information and the data representative of the unique identifier associated with the first recipient system.

12. The method of claim 11, wherein the transaction authorization is received from the user mobile communication device with further information altering the transaction information, the method further comprising providing the further information to the first recipient system, the further information comprising a transaction amount.

13. The method of claim 7, wherein the payment account information comprises information from a credit card, debit card, or gift card.

14. Non-transitory computer-readable media comprising code which, when executed by one or more processors of one or more data processing systems, causes the one or more data processing systems to implement:

a user mobile communication device initiating a transaction, the initiating comprising the user mobile communication device obtaining a unique identifier identifying a first recipient system comprising a point-of-sale system, and sending a communication comprising payment account information from a payment account, data representative of the unique identifier, and a transaction authorization to a server system configured to operate as a secure intermediary between a plurality of other devices wherein communications with the server system are encrypted;

the server system:

receiving the communication from the user mobile communication device and determining, using the received data representative of the unique identifier and a set of unique identifiers stored in the memory in association with corresponding network addresses, a first network address for the first recipient system, and transmitting the received payment account information and the transaction authorization to the first recipient system at the first network address, the data representative of the unique identifier being different from the first network address;

receiving, from the first recipient system, a communication comprising the payment account information, transaction information for the transaction, and a unique identifier identifying a second recipient system, the second recipient system comprising a transaction server;

determining, using the unique identifier received from the first recipient system and the set of unique identifiers stored in the memory in association with corresponding network addresses, a second network address for the second recipient system, and transmitting the payment account information and transaction information to the second recipient system at the second network address for processing the transaction, the unique identifier received from the first recipient system being different from the second network address;

receiving, from the second recipient system, a transaction confirmation message; and in response to receiving the transaction confirmation message from the second recipient system, sending the transaction confirmation to the first recipient system using the first network address;

receiving, from the first recipient system, a further communication comprising the transaction confirmation and a unique identifier identifying the user mobile communication device; and in response to receiving the further communication, determine a network address for the user mobile communication device from the unique identifier identifying the user mobile communication device and sending the transaction confirmation to the user mobile communication device.

15. The non-transitory computer-readable media of claim 14, wherein the method further comprises the first recipient system generating an image using the unique identifier associated with the first recipient system, and displaying the image on a display to thereby provide the user mobile communication device with the data representative of the unique identifier associated with the first recipient system.

16. The non-transitory computer-readable media of claim 14, wherein the method further comprises the user mobile communication device capturing the image using a sensor, the data representative of the unique identifier associated with the first recipient system comprising captured image data.

17. The non-transitory computer-readable media of claim 14, wherein the method further comprises transmitting the transaction information received from the first recipient system to the user mobile communication device prior to receiving the transaction authorization.

18. The non-transitory computer-readable media of claim 14, wherein the transaction authorization is received from the user mobile communication device separately from the payment account information and the data representative of the unique identifier associated with the first recipient system.

19. The non-transitory computer-readable media of claim 18, wherein the transaction authorization is received from the user mobile communication device with further information altering the transaction information, the method further comprising providing the further information to the first recipient system, the further information comprising a transaction amount.

20. The non-transitory computer-readable media of claim 14, wherein the payment account information comprises information from a credit card, debit card, or gift card.

\* \* \* \* \*